INVENTOR.
HOLLIS L. DeVINES
BY
Lothrop & West
ATTORNEYS

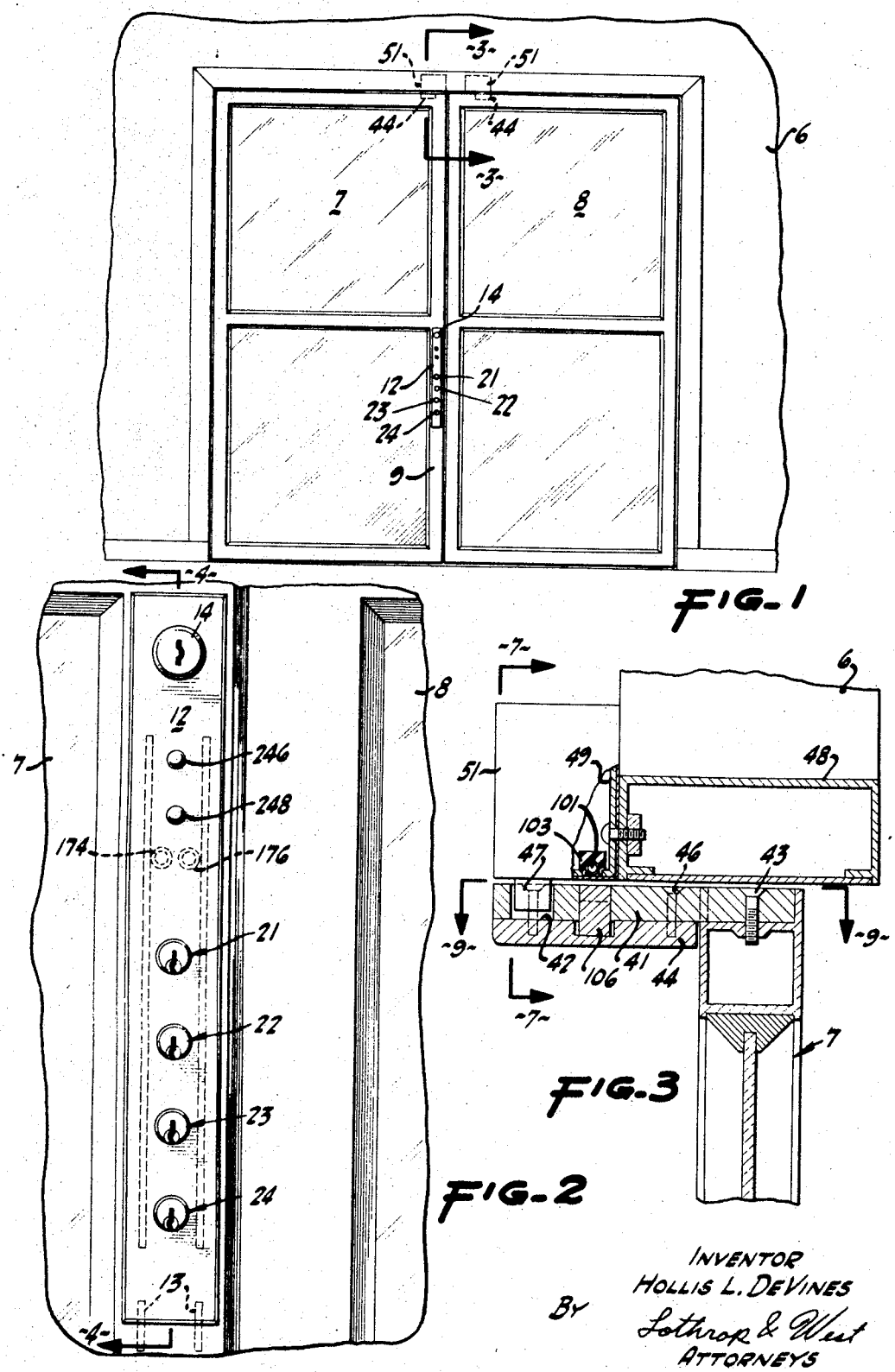

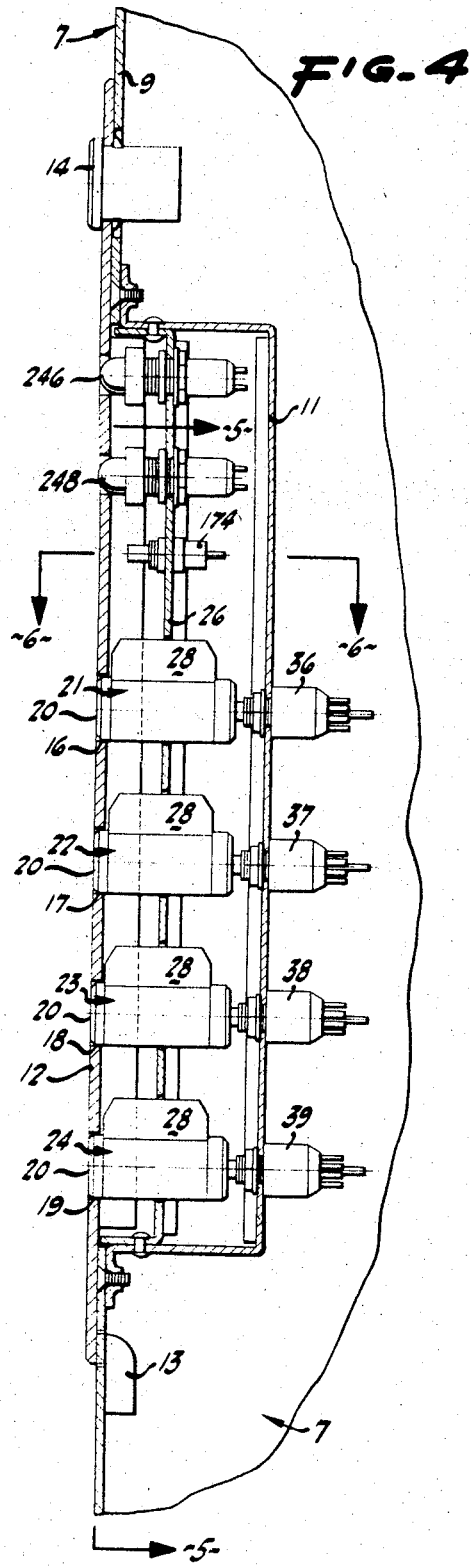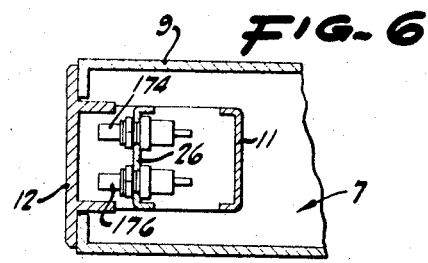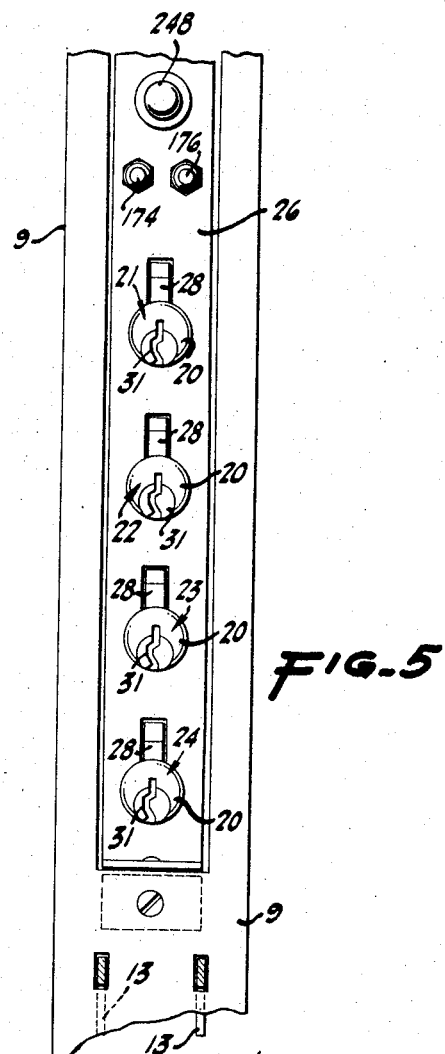

INVENTOR.
HOLLIS L. DE VINES
BY
Lothrop & West
ATTORNEYS

April 8, 1969 H. L. DE VINES 3,438,051
KEY RECORDING SYSTEM
Filed Jan. 6, 1967

INVENTOR.
HOLLIS L. DEVINES
BY
Lothrop & West
ATTORNEYS

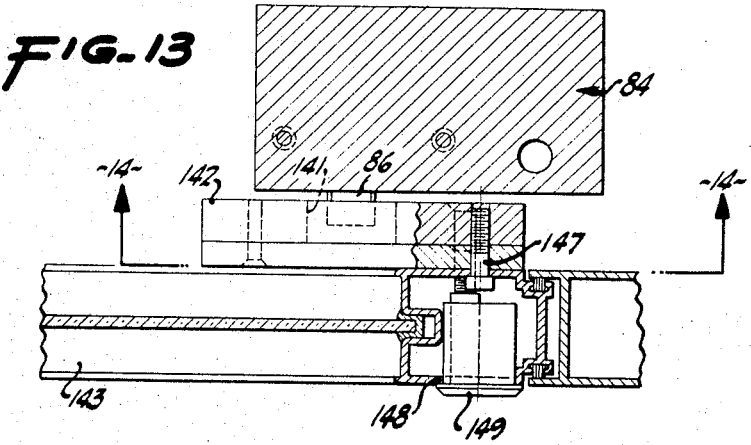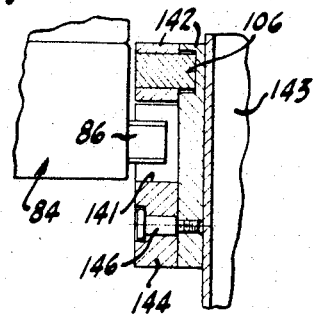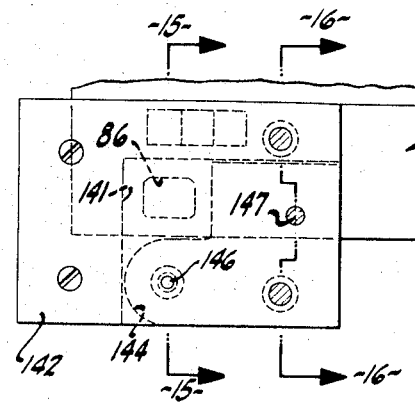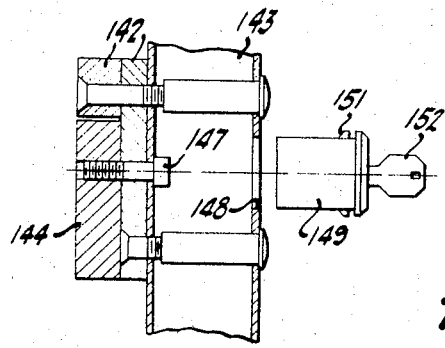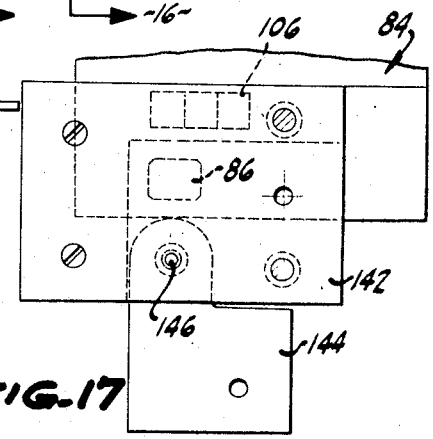

United States Patent Office 3,438,051
Patented Apr. 8, 1969

3,438,051
KEY RECORDING SYSTEM
Hollis L. De Vines, San Francisco, Calif., assignor to Schlage Lock Company, a corporation
Filed Jan. 6, 1967, Ser. No. 607,824
Int. Cl. G01d 9/36
U.S. Cl. 346—53
5 Claims

ABSTRACT OF THE DISCLOSURE

A plurality of rotatable key receivers are associated with one door, each receiver being receptive of a different one of a number of keys. A bolt on the door is electrically thrown between locked and unlocked positions as any of the key receivers is turned to an extreme "locked" position or to another extreme "unlocked" position, and simultaneously a recorder is actuated to print the designation of the particular key receiver rotated and which extreme position it is turned into. Also, the recorder is disabled when the door is ajar.

My invention relates to devices particularly intended for application on secured areas to which access can be had through doors and the like normally controlled by key locks, and it is the general purpose of the invention to provide a means for recording and indicating which of a number of authorized persons enters and leaves the secured enclosure, the time of his entry, the time of his exit and also to give some indication that the enclosure is secure when intended to be locked and is open when intended to be open.

While the invention is useful in this connection, it has also other applications wherein any one of a number of different controlling keys may be utilized remotely to operate one or more power-driven locking elements such as a bolt or latch bolt and wherein some record of the opening and closing of the enclosure is desirable.

In many instances, an enclosure such as a store, for example, may be provided with a number of different kinds of doors, both swinging and sliding, and other similar openings, each of which is intended to be closed and locked when the store is secured and all of which may be opened when the store is itself opened. If individual lock sets with individual keys are provided on the various openings, it not only takes a long time for one of the larger establishments to be opened and to be closed, but there is no central indication whether or not the entire enclosure is in open condition or in closed condition. It is also often advisable to learn which one of several authorized people has gained access to or has left the enclosure and to know what time he enters or opens the enclosure and what time he leaves or closes the enclosure.

There are occasions also in an electrically powered system during power failures that it is necessary to gain or to prevent access to the enclosure despite the absence of power.

It is therefore an object of my invention to provide a key recording system which can readily be operated by authorized persons each having his own individual key and which will afford a printed record of the time a particular individual opened the enclosure, his identity, the time an individual closed the enclosure, his identity, and to indicate other information such as the date and comparable items.

Another object of the invention is to provide a key recording system which can readily be adapted to use with standard keys and key cylinders already available.

Another object of the invention is to provide a key recording system in which the recording mechanism is substantially standard.

A further object of the invention is to provide a key recording system in which the use of the premises by various authorized individuals is recorded.

Another object of the invention is to provide a key recording system giving visual indication of the condition of the premises; that is to say, whether secure or not secure.

Another object of the invention is in general to provide an improved key recording system.

A further object of the invention is to provide a key recording system in which remote control of one or more door panels can be effectuated by one or more authorized keys.

A further object of the invention is to provide for ready, authorized changes in the effective keys.

Other objects together with the foregoing are attained in the embodiments of the invention described in the accompanying description and illustrated in the accompanying drawings, in which:

FIGURE 1 is a front elevation of a building opening; for example, an entrance having swinging doors and carrying some of the mechanism included in the key recording system of the invention;

FIGURE 2 is a view to an enlarged scale of the key receiving and control means of FIGURE 1;

FIGURE 3 is a cross section, the plane of which is indicated by the line 3—3 of FIGURE 1;

FIGURE 4 is a cross section, the plane of which is indicated by the line 4—4 of FIGURE 2;

FIGURE 5 is a cross section, the plane of which is indicated by the line 5—5 of FIGURE 4;

FIGURE 6 is a cross section, the plane of which is indicated by the line 6—6 of FIGURE 4;

FIGURE 13 is a view somewhat like FIGURE 11 but shows an arrangement including an emergency strike mechanism;

FIGURE 14 is a cross section, the plane of which is indicated by the line 14—14 of FIGURE 13;

FIGURE 15 is a cross section, the plane of which is indicated by the line 15—15 of FIGURE 14;

FIGURE 16 is a cross section, the planes of which are indicated by the lines 16—16 of FIGURE 14;

FIGURE 17 is a view similar to FIGURE 14 but showing the emergency strike in release position;

Figure 7:
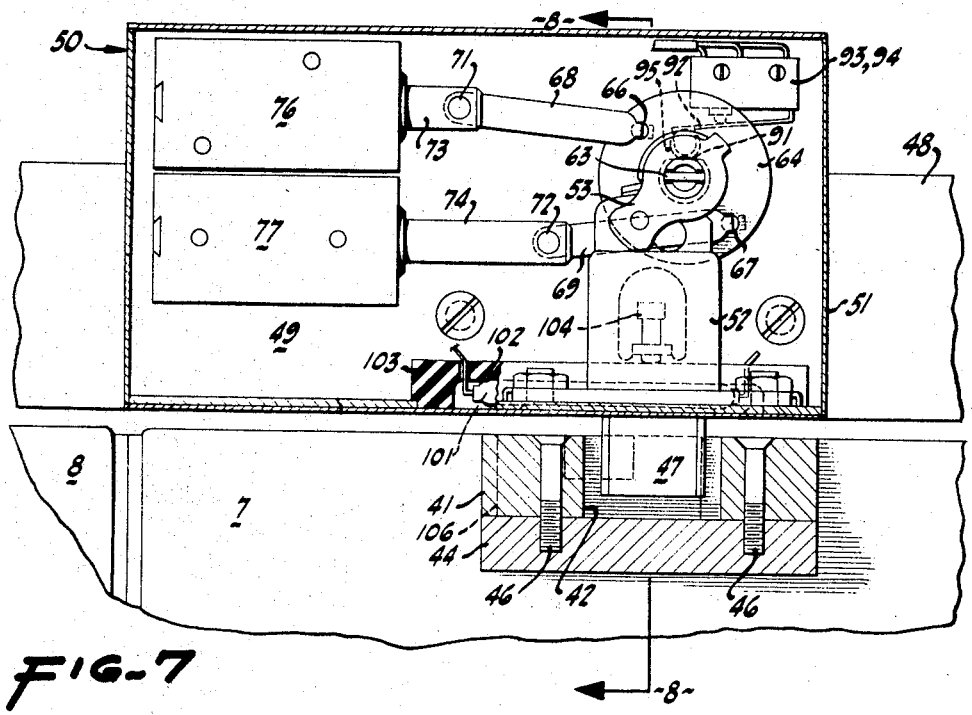
FIGURE 7 is a cross section, the planes of which are indicated by the lines 7—7 of FIGURE 3.

In its preferred form and as it has been successfully embodied, the key recording system herein is installed, for example, in connection with an enclosure such as a supermarket or store which has a number of doorways and other openings leading thereto, all of which must be securely closed and locked when the enclosure is not in use and is to be kept from marauders, and some or all of which are to be opened when the enclosure itself is to be opened. In a situation of this sort, keys allowing individual access are given to several of the store managers; for example, four such managers. Also, there may be provision for access to at least part of the mechanism by a supervisor in charge of changing the lock mechanisms and of maintaining the key recording system.

In a typical installation the enclosure or building 6 (FIGURE 1) may be provided with a pair of main swinging doors 7 and 8, each of which is mounted to swing away from the meeting faces of the doors about appropriate hinges (not shown) so that each of the individual panels 7 and 8 can swing on its own vertical axis. In this instance, four different individuals have access to the enclosure, each by means of his own individual key. The number four is chosen only as an example, since the system can be designed to operate with as few as two different, authorized keys and with a much larger number of authorized keys. Conveniently situated in the frame of the door or in the stile 9 of the door panel 7, for example, is a housing 11 (FIGURE 4). This has an open front normally closed by a removable cover 12 having inwardly extending hooks 13 at its lower end to engage with the stile 9 and at its upper end having a master lock unit 14 for securing the cover in place.

The cover has a number of openings 16, 17, 18 and 19 therein just sufficient to receive the rotary plug portion 20 of a number of standard pin tumbler cylinder units 21, 22, 23 and 24, respectively. These units are preferably mounted through a partition wall 26 spanning the interior of the housing 11. The pin tumbler cylinder mechanisms have radial vanes 28 interengaging partition openings so that the cylinder units cannot rotate and are firmly mounted. The individual plugs 20 of the units 21, 22, 23 and 24 are of the usual sort and each has its own keyway 31. While the keyway cross sections may differ, they preferably are alike, and it is preferred that each of the cylinders 21, 22, 23 and 24 be arranged to receive its own unique key not effective in the others of the plugs 20.

Instead of being directly connected to some sort of bolt mechanism, each of the plugs 20 of the units 21, 22, 23 and 24 is connected to its individual one of a number of multipoint switches 36, 37, 38 and 39. These are secured to the casing 11 and are preferably directly aligned with the plugs 20 and rotate therewith when the appropriate keys are utilized. Customarily, the construction of the plugs 20 is such that they can be turned in either direction from a central position illustrated in FIGURE 5, being turned clockwise, for example, in order to afford a locking function and being turned counterclockwise when performing an unlocking function. There is a substantial amount of lost motion between the two extreme locked and unlocked positions, but the key is removable only when the plug is rotated to its central or neutral position.

The arrangement is such that the switches 36, 37, 38 and 39 all have generally similar but specifically different functions, the functions being carried out preferably by electricity, although hydraulic, compressed air and mechanical interconnections are readily substituted.

It is usually the case that the enclosure or store building 6 being controlled has many more than the single doorway panels 7 and 8, but even though there may be several such openings, the control mechanism associated with each of them is like most of the others. In this description reference to one structure may include a number of duplicates.

Figure 22:
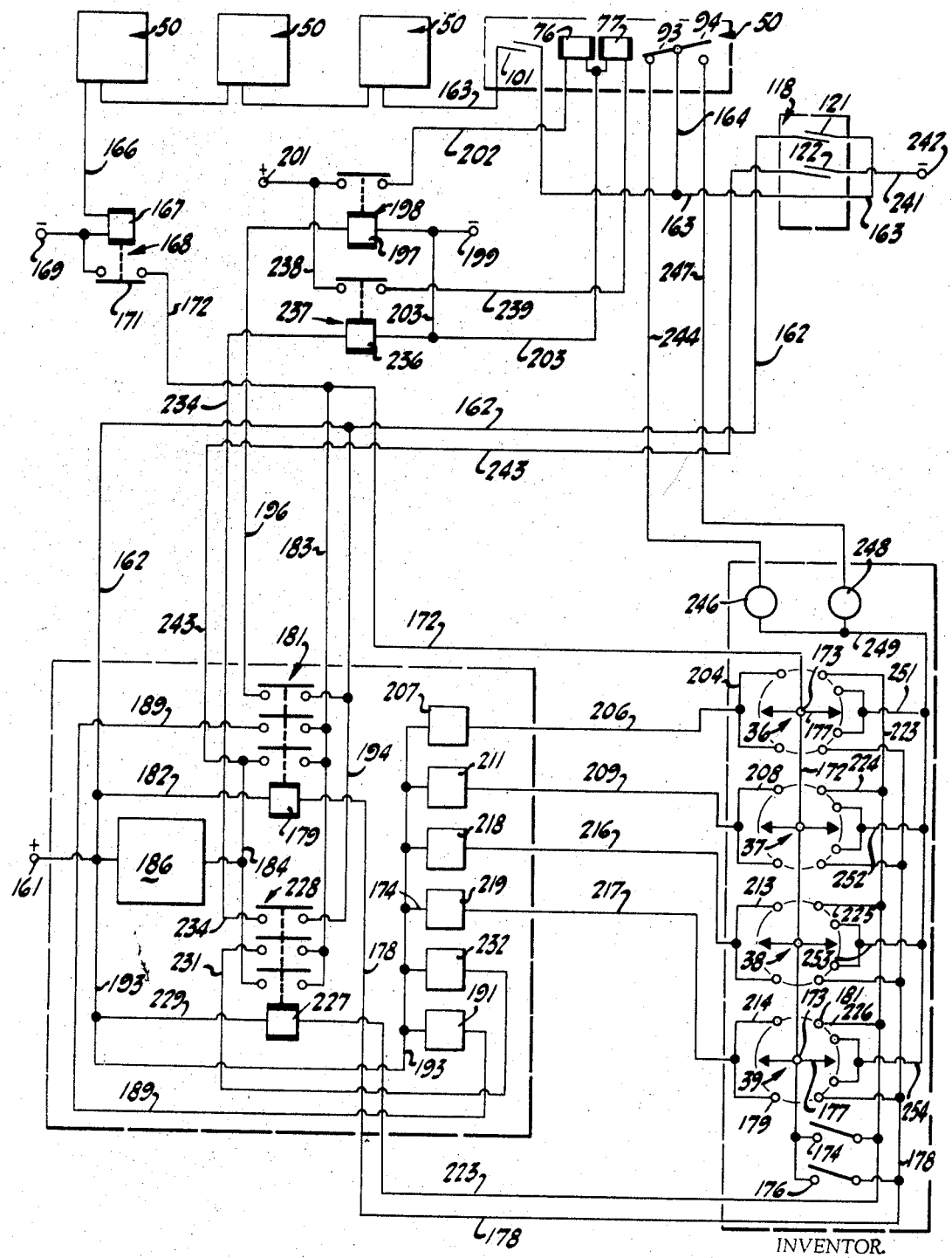
FIGURE 22 is a simplified circuit diagram of a typical wiring arrangement for use in connection with the key recording system of the invention.

The switches 36, 37, 38 and 39, as pointed out later in connection with the wiring diagram of FIGURE 22, are each effective to control a bolt actuating mechanism of the sort shown in FIGURES 7 and 8, for example. The mechanism is duplicated above each of the panels 7 and 8, and the description of one applies to the other. The swinging panel 7 is preferably provided at its upper edge with an inwardly extending, overhanging locking plate 41 having a strike opening 42 near its outer end. The plate 41 is secured in position by fastenings 43 and is also preferably underlain by a cover plate 44 secured in position by fastenings 46. When the door panel is in or very near closed position, the strike opening 42 underlies a bolt 47 movable between one extreme position in which the bolt is projected into the strike opening 42 and another position in which the bolt is withdrawn and does not interengage with the plate 41.

Mounted on the door frame 48 is a support plate 49 included in an activating unit 50 which also has a casing 51 enclosing a standard bolt housing 52 within which the bolt 47 is reciprocable. The bolt is moved in the customary way and with some lost motion between two overcenter or extreme positions and is retained by spring means in either extreme position. This much of the bolt mechanism is standard. A bolt actuator on the housing 52 has a lever mechanism 53 rotatable about the axis of a shaft 62 journalled in the housing 52 and in the plate 49. Rotation of the lever 53 in an appropriate direction either projects or retracts the bolt.

Means are provided for rotating the lever 53 in a sufficient amount and in the proper direction to control motion of the bolt. The sleeve 62 carries a driver blade 63 at its outer end interengaged with a noncircular opening in the lever 53 so that rotation of the shaft 62 effectuates operation of the bolt 47. The shaft 62 likewise carries a driving disk 64 having a pair of openings 66 and 67 therein receiving pitmen 68 and 69. These are connected by pivots 71 and 72 to the armatures 73 and 74 of a pair of solenoids 76 and 77 secured to the plate 49.

When the solenoid 76 is energized, its armature 73 is drawn therein and the disk 64 is rotated into the position shown in FIGURE 7 with the latch bolt 47 projected into the strike opening 42, so that the door panel is locked. On the other hand, when the solenoid 77 is energized, the armature 74 is drawn therein, the disk 64 is rotated through approximately a ninety degree angle, and the bolt 47 is retracted from and is quite free of the strike plate 41, so that the door panel is freely movable with respect to the door frame 48. This mechanism amounts to an electrically driven arrangement for projecting and retracting the bolt 47. The arrangement is such that when any one of the keys is turned the switches are appropriately put in circuit with the respective solenoids 76 and 77 so that the indicated door panel and all others like it are simultaneously locked or unlocked.

Figure 10:
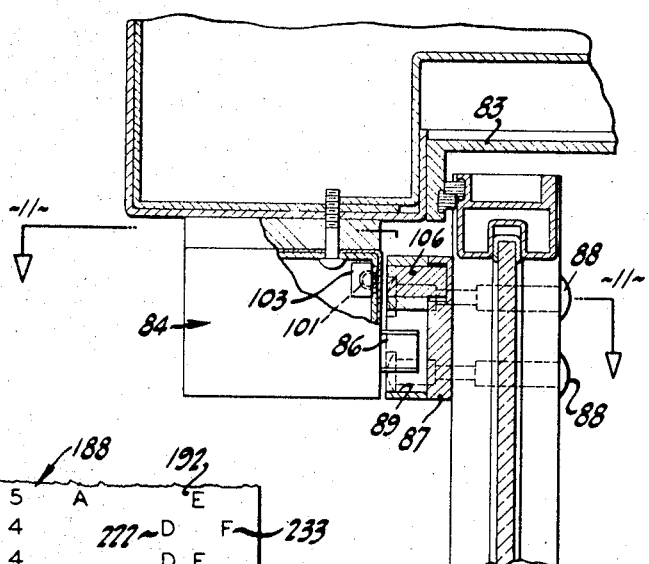
FIGURE 10 is a cross section in a vertical transverse plane through a modified form of the invention showing certain sliding door mechanism with parts of the figure being broken away.
Figure 11:
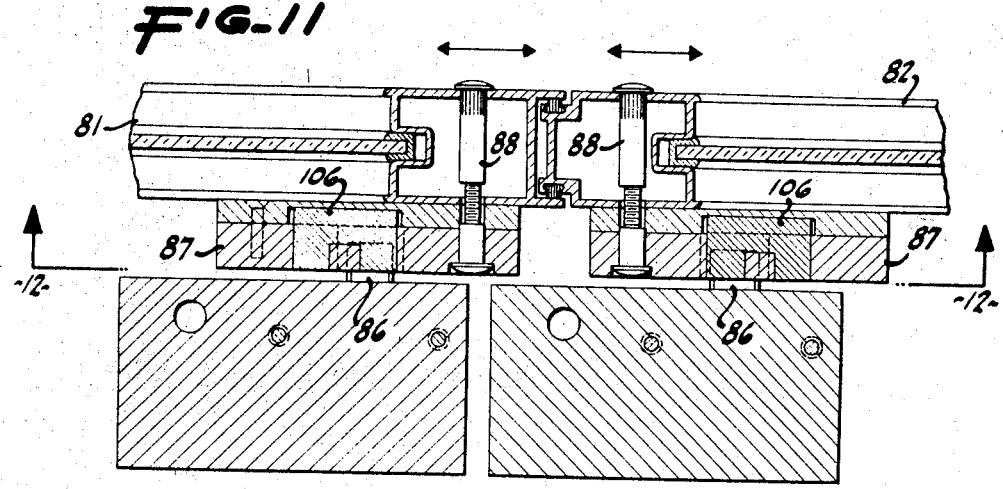
FIGURE 11 is a cross section, the planes of which are indicated by the lines 11—11 of FIGURE 10.
Figure 12:
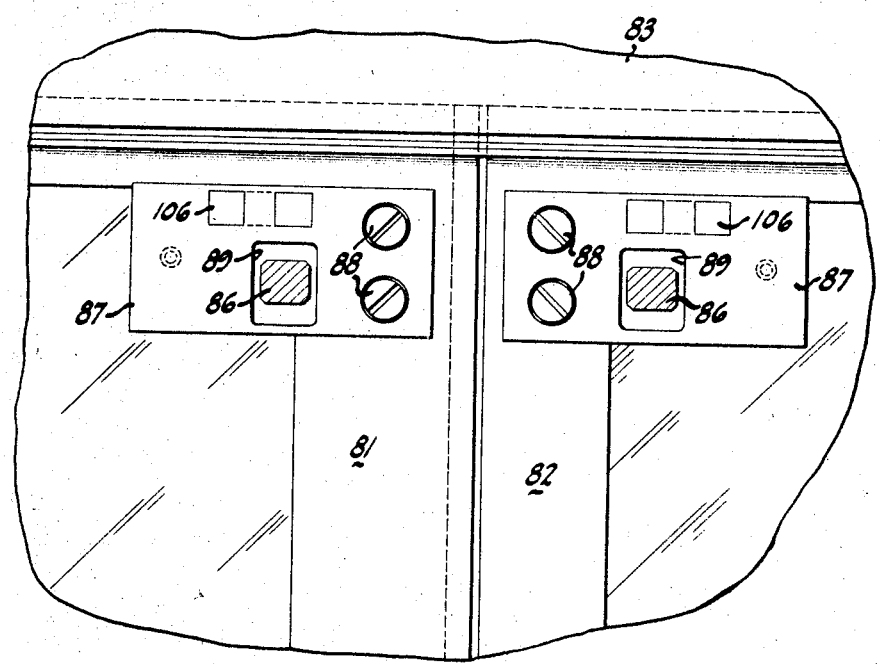
FIGURE 12 is a cross section, the plane of which is indicated by the line 12—12 of FIGURE 11.

As particularly shown in FIGURES 10, 11 and 12, the electrically actuated bolt projecting and retracing mechanism may be applied not only to swinging doors of the sort shown in FIGURE 1, but is likewise adapted for use on sliding doors. Various combinations of swinging and sliding doors may be used to gain access to the enclosure. In this instance the sliding door panels 81 and 82 (FIGURE 12) move with respect to a door frame 83 (FIGURE 10) carrying an electrical bolt-projecting mechanism 84 of the sort previously described in detail and as shown in FIGURE 7. In this instance, the mechanism 84 is affixed to the frame 83 to project the bolt 86 toward and away from the side face of the sliding panel 81 or 82. Each of the panels carries a block 87 held in place by appropriate fasteners 88. The block is formed to provide a strike opening 89 of adequate size readily to accommodate the bolt 86 when the doors are in closed position. When the bolt is projected into the opening 89, the corresponding door panel cannot be moved.

In addition to the means for remotely and simultaneously actuating all of the door bolts, whether swinging or sliding, means are provided for determining whether or not the door panels, whether swinging or sliding, are in their closed position. If such an arrangement were not provided, the bolts for the individual door locking units might be projected when the door panels themselves were not in fully closed position and would then give a false indication of locking, whereas the doors would actually be open.

Figure 8:
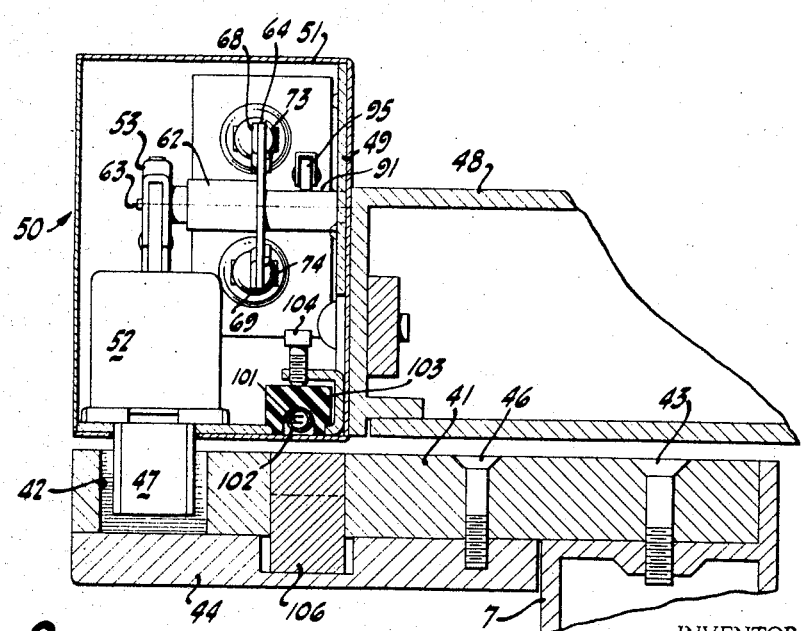
FIGURE 8 is a cross section, the plane of which is indicated by the line 8—8 of FIGURE 7.
Figure 9:
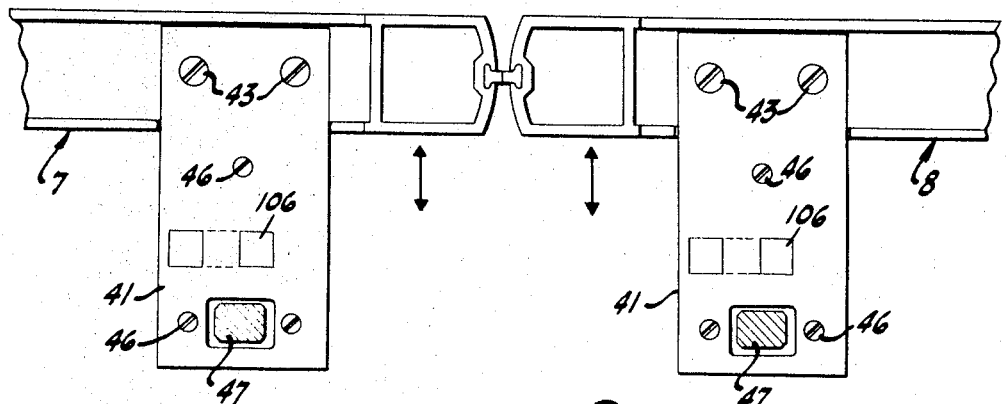
FIGURE 9 is a cross section, the plane of which is indicated by the line 9—9 of FIGURE 3.

For that reason, as particularly disclosed in FIGURES 7, 8 and 10, each of the actuating units such as 50 and 84 includes a means for indicating whether or not the actuator is in bolt-retracted or bolt-projected condition and also contains means for establishing the closed positioning of the door panel itself.

One of these devices includes a flat or cam 91 (FIGURES 7 and 8) on the shaft 62 against which the common actuating arm 92 of a pair of microswitches 93 and 94 is positioned. An antifriction roller 95 follows the cam contour. The switches 93 and 94 are preferably duplex units with two sets of contacts. One set of contacts is effective to close one circuit, and the other set of contacts holds open the other circuit when the roller 95 is on the flat 91, which occurs when the bolt is projected, as shown in FIGURE 7. The first set of contacts are opened and the second pair of contacts are closed when the roller is on the circular part of the shaft, which occurs when the bolt 47 is retracted. Thus the two extreme positions of the actuating mechanism determine which set of the switch contacts is in closed position and correspondingly which of the alternative circuits is energized.

The second of the devices, which indicates the closed position of the door panel with respect to the frame in each instance, incorporates a sensitive or reed switch 101 mounted in a capsule 102 disposed in an insulating block 103 removably fastened in position and held in place by a clamp screw 104. The normally open reed switch is magnetically responsive and is closed under the influence of a relatively strong magnetic field.

Mounted in the plate 41 on the swinging door panel or in the block 87 of the sliding door panel is a magnet 106 suitably retained in place and adapted when the door panel is in closed position closely to underlie the adjacent one of the reed switches 101. This position of the magnet then affords a field effective to close the adjacent reed switch. However, when the door panel is opened, either by sliding or by swinging, to move the magnet away from the reed switch and thus greatly to weaken or to remove the magnetic field, the reed switch, being resilient and being deprived of a closing force, returns to its normally open condition. Each of the door openings is provided with a similar indicating mechanism including the switches 93 and 94 and also including a reed switch 101.

Figure 18:
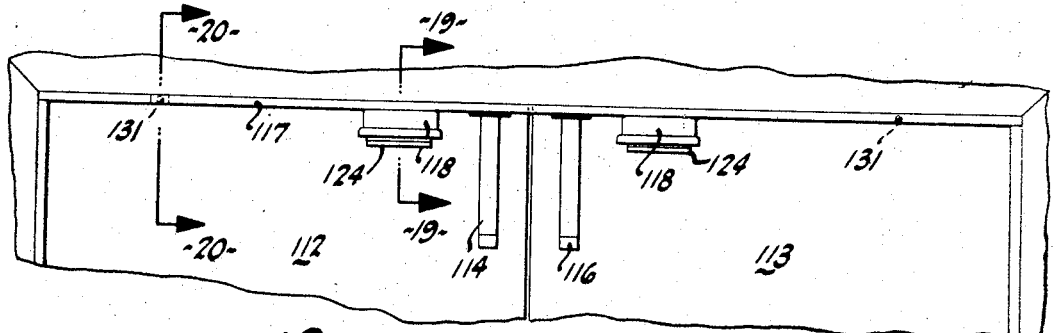
FIGURE 18 is an interior elevation of a modified form of the invention including means useful in connection with doors without remote locking structures.
Figure 19:
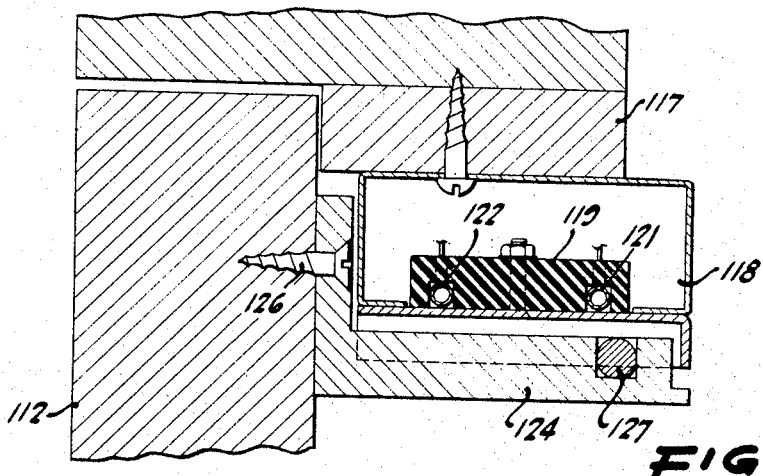
FIGURE 19 is a cross section, the plane of which is indicated by the line 19—19 of FIGURE 18.
Figure 20:
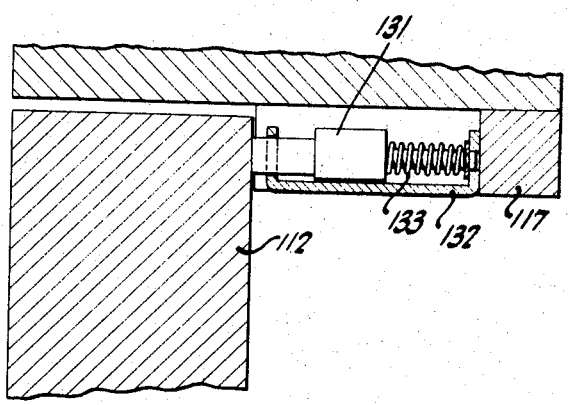
FIGURE 20 is a cross section, the plane of which is indicated by the line 20—20 of FIGURE 18.

In some instances, due to local fire or building ordinances or for other reasons, it is not permitted to provide a remotely controlled bolt as shown in FIGURE 1, for example, on one or more of the door openings to the enclosure. In this instance, as shown in FIGURES 18, 19 and 20, the panels 112 and 113 of these particular doors, no matter how mounted, are put in secured or closed position and are locked by means of manually engaged bolts 114 and 116. These may be so-called panic bolts if required. They are manually actuated and are in extended position when the doors are in closed position. No indication of the position of the bolts 114 and 116 is given, but an indication of the door panel position is afforded. For that reason, there is secured adjacent the individual door panel and to the superposed frame 117 a reed switch housing 118 incorporating a mounting block 119. Within the mounting block 119 is a first reed switch 121 and a second, spaced reed switch 122.

To the door panel 112, for example, there is applied an extension 124 secured in position by a fastening 126 and carrying a permanent bar magnet 127 positioned in the vicinity of the reed switch 121 when the door panel is in closed position. The magnet 127 then actuates and closes the normally open reed switch 121. The magnetic field adjacent the remote switch 122 is then so weak as to leave that switch entirely open. When the panel 112 is swung open, the magnet 127 leaves the vicinity of the reed switch 121, which then changes from closed to open position due to its normal resiliency, and the magnet 127 in sweeping over the reed switch 122 momentarily moves the switch from normally open to closed position, thus affording a signal that the door panel is being opened.

It is possible that the panel 112 might be unbolted and only slightly opened so that the magnet 127 does not move far enough to release the switch 121 from its closed condition nor to influence the switch 122 into closed condition. For that reason, there is provided on the panel 112 and also on the panel 113 a plunger 131 mounted in a bracket 132 on the door frame 117. The plunger butts against the face of the panel 112 at one end and at the other end is impelled by a spring 133 in a direction to urge the door panel 112 toward open position. When the bolt 114, for example, is withdrawn, the spring 133 is effective on the plunger 131 to move the door panel 112 far enough from the switch 121 and close enough to the switch 122 to change the condition of both of those switches and thus to afford a signal that the door panel 112 is in open condition.

While it is preferred to have the security of the entire enclosure regulated by a completely automatic and, for example, electrically energized system, it is recognized that there may be power failures and that under those circumstances the system might retain the enclosure completely sealed when access is necessary. To deal with this condition, there is provided an emergency strike as illustrated in FIGURES 13-17 inclusive. In this instance, on at least one of the entrance doors, in this case on a sliding door, there is provided a special strike mechanism. An actuating unit 84 as previously described in connection with FIGURE 10 is mounted on the door frame and projects and retracts a bolt 86 as previously indicated. The bolt 86 is movable into and out of a strike recess 141 very much like the strike opening 89, except that the opening is only in part defined by a block 142 secured to the door panel 143.

Part of the opening, at least one side thereof, is defined by a swinging arm 144 of approximately L shape having a pivot mounting 146 near the end of one leg, so that the arm 144 can swing through approximately ninety degrees from a secure position as shown in FIGURE 14 into a release position as shown in FIGURE 17. The arm 144 is normally retained in its secured position by a screw 147 which passes into the mounting block 142 from the exterior of the door panel 143. The screw 147 requires a special wrench such as an Allen wrench and is introduced through an aligned opening 148 in the material of the door panel 143. A removable cylinder lock unit 149 is adapted to pass in through the opening 148 and has snap retainers 151 designed to engage beneath the material of the door frame when the lock is in position over the screw 147. The lock 149 is removable by the use of a key 152 which also serves when turned to unlocked position to retract the retainers 151 so that the lock unit can be removed with the key 152 from the opening 148, and thus will disclose the screw 147. When the screw 147 is removed by an Allen wrench, the arm 144 can move from its FIGURE 14 position to its FIGURE 17 position. It no longer need lie in the path of the projected bolt 86, and so permits the sliding door to be moved toward open position, thus affording access to the interior of the enclosure even though the door is technically locked.

With the various instrumentalities described, there is provided an arrangement in which a remotely controlled mechanism locks or unlocks simultaneously all of the openings to an enclosure and also affords signals for the locked or unlocked and open or closed condition of all or of the selected ones of the doors therein.

Although pneumatic, hydraulic and even mechanical arrangements are feasible, in the present instance the electrical system is arranged pursuant to the wiring diagram of FIGURE 22, so that not only are there afforded appropriate actuations of the units and appropriate signals therefrom, but the signals are both by temporary indications and preferably by a permanent printed record.

The electrical circuitry (FIGURE 22) is traced from a positive connector 161 joined to any suitable source, not shown, through a conductor 162 extending to one of the switch units 118 which may be installed on the frame of a manually bolted door panel. Within the unit 118 the conductor 162 is connected to the reed switch 121 which is in closed position when the door itself is closed. From the reed switch 121 a conductor 163 extends in series through switch units duplicating the switch unit 118, if any, and then extends serially to all of the remotely actuated bolt units 50. In each of the units 50, the conductor 163 is connected to the reed switches 101 therein. Each switch 101 is in closed position when its door panel is in closed position. From the conductor 163 a conductor 164 extends to the common point of the microswitches 93 and 94 and similarly in parallel to the microswitches 93 and 94 of any other units 50. From the last of the series of units 50 a conductor 166 extends through the solenoid 167 of a relay 168 and from the solenoid extends to a negative connector 169 joined to the source.

With this arrangement, when all of the door panels are in closed position, a completed circuit is made through the relay solenoid 167 and closes a bar switch 171. If any one of the door panels is not closed, the circuit is not completed and the relay 168 is de-energized. The bar switch 171 stays in or moves to open position to prevent operation of additional circuits controlled thereby. In effect, when the doors are closed, the additional circuits are active and can be utilized, but when any one of the doors is ajar, the circuits controlled by the switch 171 are broken and all mechanism controlled by the switch 171 cannot be utilized.

From the switch 171 an additional circuit is traced through a conductor 172 to the center points 173 of the multipoint switches 36, 37, 38 and 39, in series, and also in series to one side of a manual switch 174 and of a manual switch 176. Both the switches 174 and 176 are mounted on the partition wall 26 (FIGURES 4-6) and are accessible for a supervisor and for test purposes, but only when the master lock unit 14 is actuated and the cover is dropped.

When any one of the diametrical switch arms 177 of any of the multipoint switches 36, 37, 38 and 39 is turned by its key in a clockwise direction from the central position shown in FIGURE 22 through about sixty degrees, it joins the center point conductor 172 with the adjacent branch of a conductor 178 to which the manual switch 176 is also connected. When completed by any of these means, the circuit is then traced through the conductors 172 and 178 to the actuating solenoid 179 of a multipole locking switch 181. From the solenoid 179 a lead 182 extends to a junction with the conductor 162. The lower and central subswitches of the locking switch 181 are joined on one side to the conductor 172 by a lead 183. The lower subswitch when closed is joined on the other side to a conductor 184 connected through a printing head 186 to join the conductor 162 and so complete the circuit.

Figure 21:
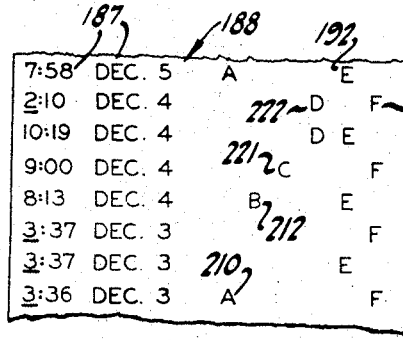
FIGURE 21 is a representation of a typical record made by the key recording system of the invention.

The printing head 186 is a standard, commercial unit and, when energized, stamps certain information 187 (FIGURE 21) such as the date and time on a strip of recording paper 188.

The central subswitch of the locking switch 181, when closed, is connected on its other side to a conductor 189 joined to a printing head 191 of a standard kind and effective, when energized, to imprint a symbol 192 indicating a locking operation. Any symbol can be used. Herein (FIGURE 21) it is the letter E. The circuit from the printing head 191 is traced through a conductor 193 which, with the conductor 162, is joined to the terminal 161.

The upper subswitch of the locking switch 181 operates independently of the switch 171. A branch lead 194 from the conductor 162 extends to one side of the switch 181. When the switch is closed, the circuit is traced through a conductor 196 to the coil 197 of a locking relay 198. The other side of the coil 197 goes to a terminal 199 similar to or identical with the terminal 169.

When the coil 197 is energized, the locking relay 198 is closed and a circuit is traced from a terminal 201, like or identical with the terminal 161, through a conductor 202 to the locking solenoid 76. The return from the solenoid 76 is through a common conductor 203 extending to the terminal 199. Thus, when the conductor 178 is energized either by closure of the switch 176 or by the locking rotation, as described, of any of the multipoint switches such as the switch 36, an imprint of the date and time is made on the record paper, a symbol is printed to indicate the fact of unlocking and all of the various unlocking solenoids, such as the solenoid 76, are worked to withdraw all of the door bolts such as 47 and 86 simultaneously.

When any of the switch arms 177 is actuated, as described, to connect with the conductor 178, there is also provided a record of which of the several arms (and which of the several keys) is responsible for the operation. Thus, the left end of the top switch arm 177 (FIGURE 22) when in the unlocking position closes a circuit traced from the center point 173 to a conductor 204 joined to a lead 206 effective when energized to operate a printing head 207, like the printing head 191, and also connected to the conductor 193. The head 207 prints a symbol 210 (FIGURE 21), in this case the letter A, to show that the key pertinent to the lock unit and multipoint switch 36 is responsible for the unlocking operation. Similarly, the switch arm 177 next to the top completes a circuit from its center point 173 to a lead 208 joined to a conductor 209 connected to a printing head 211 effective to print a symbol 212, such as B. The printing head 211 also is joined to the conductor 193.

Similarly, the next lower switch arms 177 respectively connect to conductors 213 and 214, each joined through separate conductors 216 and 217 to printing heads 218 and 219 in turn connected to the conductor 193. The printing head 218 prints a symbol 221, preferably C, and the printing head 219 prints a symbol 222, preferably D. In this fashion, each locking use of each key produces a distinctive and appropriate record.

A somewhat similar arrangement is provided for the unlocking function. When the center points 173 of the various switches 36, 37, 38 and 39 are in circuit with the switch 171 closed, rotation of the individual switch arms in a counterclockwise direction about sixty degrees from the FIGURE 22 position establishes certain unlocking circuits. For example, when the top switch arm 177 is so rotated, connection is made with a conductor 223 having leads 224, 225 and 226 joined thereto for each of the respectively lower switches 37, 38 and 39 and extending to the solenoid 227 of an unlocking relay switch 228. A lead 229 joins the solenoid 227 to the conductor 193.

In the unlocking relay switch 228, the lowermost switch bar when closed joins the lead 183 to the conductor 184 and so activates the printing head 186 to indicate the date and time, just as in the locking operation. The middle switch bar when closed joins the lead 183 to a conductor 231 extending to a printing head 232 also connected to the conductor 193. When energized the printing head 232 imprints on the tape a symbol 233 for "unlocked," in this instance the letter F.

The upper switch bar of the unlocking relay 228 when closed joins the lead 194 to a conductor 234 connected to the coil 236 of an unlocking relay 237, the other side of the coil being connected to the common conductor 203. When energized and closed the relay 237 joins a conductor 238 extending to the terminal 201 to a conductor 239 joined to the unlocking solenoids 77 of all of the actuating units 50. Thus, when any of the individual keys is operated in the unlocking direction to unlock the various doors, a record is made of the use of that particular key, the fact of unlocking and the time and date. Simultaneously, all of the remotely controlled doors are unlocked.

Also, when the top switch arm 177 is rotated to connect to the conductors 223, it establishes a connection through the lead 206 to the printing head 207, which is actuated, as before, to print the letter A, thus identifying the particular key doing the unlocking. Similarly, the other switch arms 177 when moved to unlocked position place their respective leads 209, 216 and 217 in circuit to energize their respective printing heads 218, 219 and 232 for the symbols B, C and D.

Since the door panels 112 and 113 may be opened without reference to the rest of the actuating system and, in fact, normally stand ajar when the bolts 114 and 116 are manually retracted, the reed switch 121 or switches when open interrupt the conductor 162, thus precluding the remote locking of the other doors and a locking symbol imprint. When the panels 112 and 113 are themselves in closed position, their reed switches 121 are closed and the conductor 162 is continuous. These same effects are also produced by the other reed switches.

Means are also provided for affording an imprint each time one of the panels 112 and 113 is swung open or is swung closed. A lead 241 from a negative terminal 242 extends through the reed switch 122 or switches to a conductor 243 joined to the conductor 184 leading through the printing head 186 to the positive terminal 161. Each time a panel 112 or 113 swings its magnet 127 past the reed switch 122, the circuit to the printer is momentarily closed and a record of the date and time of the door panel movement is made.

A visual indication of the state of the system is also afforded. When the switch 121 is closed to connect through the conductor 162 to the terminal 161, the circuit extends through the conductor 163 and the conductor 164 to a common connection for the microswitches 93 and 94. If a lock unit is unlocked and the switch 93 is closed, the circuit continues through a lead 244 to an "unlocked," preferably red, indicator light 246. If a lock unit is locked and the switch 94 is closed, the circuit continues through a lead 247 to a "locked," preferably green, indicator light 248. The lights 246 and 248 are joined by a common lead 249 connected by branches 251, 252, 253 and 254 to the respective multipoint switches 36, 37, 38 and 39. If both lights are lit, it is an indication that the system is not in normal condition.

In each one of the multiswitches a pair of contact points are provided at the divided ends of the branches 251 and the like. The contact points are disposed on opposite sides of the illustrated, central position of the key-actuated switch arm 177. By turning the key and the switch arm in either direction about half-way toward locked or unlocked position, the user can cause a circuit completion through the center point 173. Thus if one of the remotely controlled lock units is in locked position and the panels 112 and 113 are closed, the green light 248 is lit, whereas if one of the remotely controlled lock units is in unlocked position, the red light 246 is lit. If neither the red nor the green light is illuminated, the user knows that either the panel 112 or the panel 113 is ajar.

If desired, in some installations, a version of the structure illustrated in FIGURE 2 may be supplied at a convenient point on the interior of the enclosure and connected in parallel with the exterior unit or units to permit actuation of the system from within the inclosure.

What is claimed is:

1. A key recording system for use with a door comprising a plurality of rotatable key receiving means associated with said door and each adapted to receive a different one of a number of keys, locking means associated with said door and movable between a first position locking said door and a second position unlocking said door, power means, in a first electric circuit, for actuating said movable means, a recorder in a second electric circuit, and switch means operated solely in response to the rotation of any selected one of said key receiving means by its respective one of said keys for correspondingly opening and closing said first circuit and for conditioning said second circuit to actuate said recorder to record the identity of said selected one of said key receiving means.

2. A key recording system as in claim 1 in which said recorder includes means for marking the identity of each of said rotatable key receiving means, each of said rotatable key receiving means has two extreme positions of rotation, and said recorder includes means for simultaneously marking either of said extreme positions of said receiving means.

3. A key recording system as in claim 1 in which said means associated with said door includes a mounting having a removable cover and substantially enclosing said plurality of rotatable key receiving means, and means including a lock distinct from any of said plurality of rotatable key receiving means for securing said cover against removal.

4. A key recording system as in claim 1 including means responsive to the presence of said door in closed position and the absence of said door from closed position, and means controlled by said responsive means for disabling said recorder.

5. A key recording system as in claim 4 in which said responsive means includes a magnet.

References Cited

UNITED STATES PATENTS

| | | | |
|---|---|---|---|
| 981,164 | 1/1911 | Bush et al. | 346—53 X |
| 1,043,069 | 11/1912 | Cole | 346—53 X |
| 1,611,579 | 12/1926 | Bush | 346—53 X |
| 3,093,994 | 6/1963 | Richard | 70—434 |
| 1,253,051 | 1/1918 | Knistrom | 70—434 |
| 1,390,017 | 9/1921 | Bryce | 70—434 |

RICHARD B. WILKINSON, *Primary Examiner.*

JOSEPH W. HARTARY, *Assistant Examiner.*

U.S. Cl. X.R.

70—434